United States Patent [19]
Brouwers et al.

[11] 3,989,063
[45] Nov. 2, 1976

[54] ELECTROMAGNETIC 3-WAY VALVE

[75] Inventors: Sytze Brouwers, Stegaurach;
Gerhard Brüne, Bamberg, Gaustadt;
Waldemar Hans; Helmut Staib, both
of Bamberg, all of Germany

[73] Assignee: Robert Bosch G.m.b.H., Stuttgart,
Germany

[22] Filed: Jan. 7, 1975

[21] Appl. No.: 539,222

[30] Foreign Application Priority Data
Jan. 26, 1974  Germany.............................. 2403770

[52] U.S. Cl.......................... 137/596.17; 137/627.5;
251/139
[51] Int. Cl.²......................................... F15B 13/044
[58] Field of Search.................... 137/596.17, 627.5;
251/129, 139, 141

[56] References Cited
UNITED STATES PATENTS

| | | | |
|---|---|---|---|
| 2,114,961 | 4/1938 | Gille................................. | 251/129 X |
| 2,181,423 | 11/1939 | Gille................................ | 251/141 X |
| 2,629,007 | 2/1953 | Forman............................ | 251/141 X |
| 3,043,336 | 7/1962 | Parent et al. ............... | 137/596.17 X |
| 3,383,084 | 5/1968 | Mayfield.......................... | 251/139 X |
| 3,529,620 | 9/1970 | Leiber.............................. | 251/139 X |

FOREIGN PATENTS OR APPLICATIONS
1,336,541  7/1963  France................................ 251/141

*Primary Examiner*—Alan Cohan
*Assistant Examiner*—Gerald A. Michalsky
*Attorney, Agent, or Firm*—Edwin E. Greigg

[57] ABSTRACT

An electro-magnetically actuated solenoid valve is provided with two opposing valve seats between which the armature moves axially. The armature loosely holds valve closure members which cooperate with the opposing valve seats. The valve closure members are urged apart by a spring, and the combined force of this spring and of two further springs exhibits an abrupt change which stabilizes the armature in a position approximately mid-way between the two extreme positions.

The end portion of the armature and of the cooperating pole piece is so configured that the path of the armature is limited to a region within which the magnetic force does not change rapidly.

1 Claim, 6 Drawing Figures

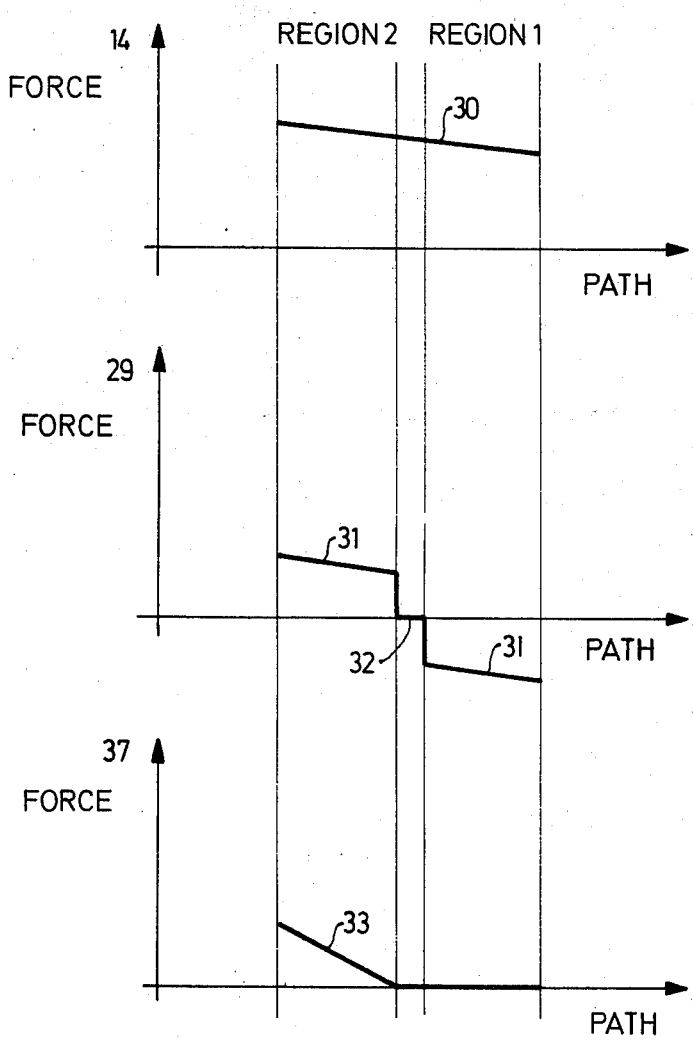

ELECTROMAGNETIC 3-WAY VALVE

BACKGROUND OF THE INVENTION

The invention relates to an electromagnetic 3-way valve assembly which is intended to be placed at the junction of a pressure receiver, a source of pressure and a relief location and which is provided with an armature carrying the closure members of a dual seat valve. When the valve is not energized, a main spring presses the armature into an initial position whereas, when energized, the magnetic force urges it in the direction of a counter end member or pole piece. The armature includes two closure members which are somewhat movable with respect to one another and also with respect to the armature and which are urged apart by a single spreader spring also located in the armature. Each of the closure members is provided with a holding flange that is axially movable in an interior groove of the armature.

A 3-way valve assembly of this kind has already been proposed previously and in that valve assembly, the spring forces must be matched to the magnetic forces. In addition, both the magnetic as well as the spring forces are subject to a certain amount of variation in magnitude due to hysteresis. Changes in pressure, frictional forces and the effects of dimensional tolerances all contribute to a relatively broad spread in the magnitude of the forces acting on the armature. Furthermore, it is sometimes advantageous if the stroke of the valve is relatively long so as to provide a certain minimum cross section for the flow of the pressure medium.

OBJECT AND SUMMARY OF THE INVENTION

It is a principal object of the invention to provide a valve assembly of the above described type wherein the electromagnet exhibits force characteristics which permit an easy adaptation to the force characteristics of the springs so as to guarantee a reliable switching of the armature both between its terminal positions when the flow cross sections are relatively large as well as from and into its central position.

This object is attained according to the invention by providing an armature and associated members so configured that the characteristic force curves of the magnet are flattened out and the force of attraction of the magnet is reduced when the armature occupies the vicinity of its magnetically actuated terminal position. The total characteristic force curve of the main spring and of the spreader spring together is then adapted to the characteristic force curves of the magnet.

The invention will be better understood, and further objects and advantages thereof will become more apparent from the ensuing detailed specification of an exemplary embodiment taken in conjunction with the drawing.

BRIEF DESCRIPTION OF THE DRAWING

FIG. 5 is a diagram of the individual spring forces; and

DESCRIPTION OF THE PREFERRED EMBODIMENT

Figure 1:
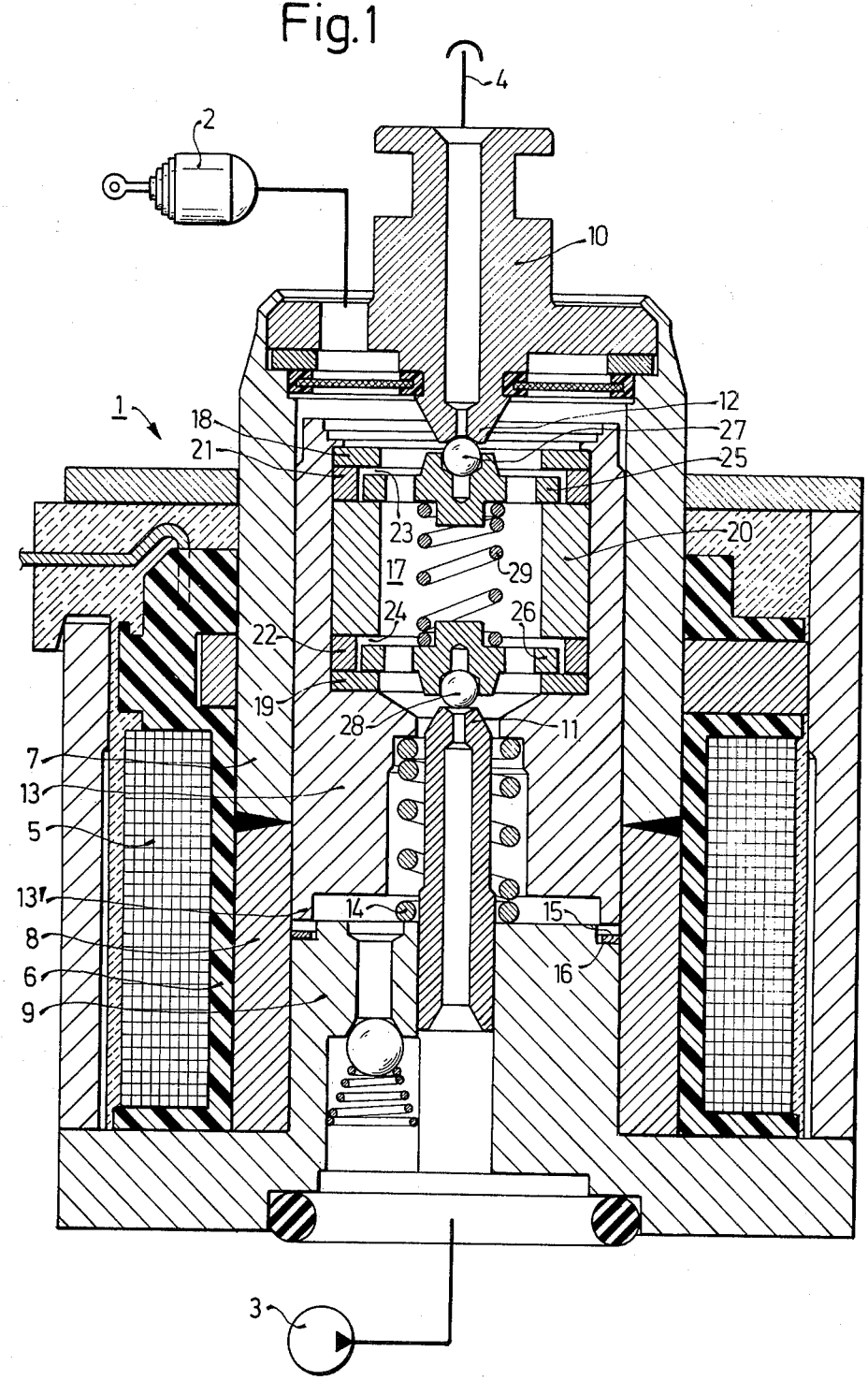
FIG. 1 is a sectional front elevational view of the valve assembly.

An electrical 3-way valve assembly 1 is disposed at the junction of a pressure receiver 2, a pressure source 3 and a relief location 4. A magnet coil 5 is mounted on a coil support 6, which, in turn is mounted on a guide tube 7, a portion 8 of which is made from a non-ferrous material.

Opposite ends of the guide tube 7 include two concentric end members 9 and 10. The counter end member 9, nearest to the pressure source 3, is provided with an inlet valve seat 11 and the end member 10, nearest to the relief location 4, forms the outlet valve seat 12. The inlet valve seat 11 extends substantially into an armature 13 axially movable within the guide tube 7. The armature is urged in the direction of the valve seat 12 by a helical main spring 14 supported on the counter end member 9. A shoulder 15 of the counter end member 9 carries a spacer ring 16 of approximately 0.3 mm thickness which limits the stroke of the armature in the terminal region as will be explained below and which also prevents magnetic sticking of the armature in the terminal position. The shoulder 15 is undercut sufficiently so that an annular collar 13' of the armature may overlap part of the counter end member 9. This configuration results in an especially flat characteristic force curve of the magnet although a somewhat different configuration could be used for the same purpose.

The armature 13 has an interior void 17 limited by the two end discs 18 and 19. The end discs 18 and 19 are held at a fixed distance by a sleeve 20 and two rings 21 and 22. Within the spaces 23 and 24 formed between the end discs 18 and 19 and the adjacent faces of the sleeve 20 are loosely contained holders 25 and 26, respectively, which carry the closure members 27 and 28, respectively. The sleeve 20, the rings 21,22 and the discs 18,19 may be combined in a single member. The holders 25 and 26, and hence also the closure members 27 and 28 are urged apart by a spreader spring 29. Thus, the closure member 28, cooperating with the valve seat 11, constitutes an inlet valve 11/28 and the closure member 27, cooperating with the valve seat 12 constitutes an outlet valve 12/27.

Figure 2:
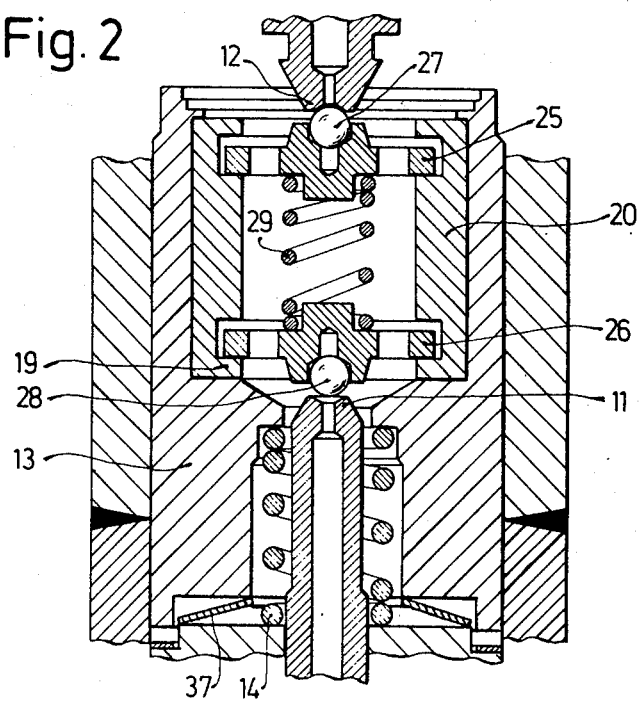
FIG. 2 shows the dual seat valve including the armature in its current-less, initial position.
Figure 3:
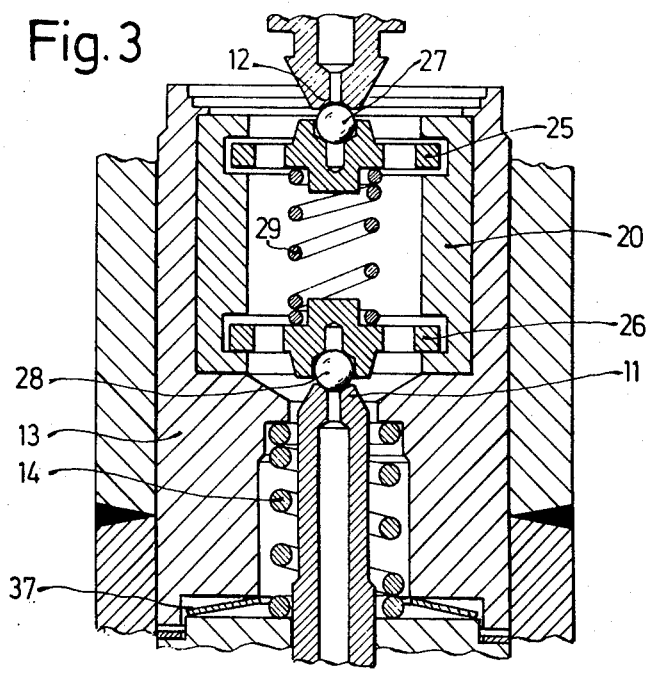
FIG. 3 shows the dual seat valve including the armature in its partially energized, stable middle position.
Figure 4:
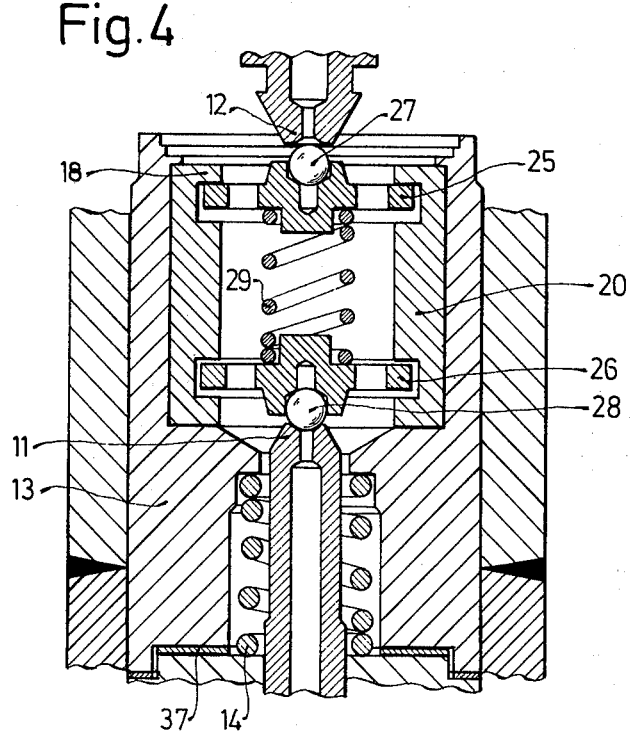
FIG. 4 shows the dual seat valve and the armature in the fully energized terminal position.

FIGS. 2 to 4 show different axial positions of the closure members 27 and 28 which they occupy under the influence of the magnetic forces acting on the armature 13 and of the combined forces of the springs 14 and 29. In these figures, a third spring 37 is shown embodied as a disc spring for the sole purpose of adapting the total spring force to the magnetic force.

FIG. 2 represents the current-less initial configuration of the valve assembly 1. The outlet valve 12/27 is closed. The inlet valve 11/28 is open relatively wide because the main spring 14 has pushed the armature 13 completely upwardly as seen in the figure, so that the carrier 26 carrying the closure member 28 is lifted by the end disc 19 and the closure member 28 does not touch its valve seat 11. The pressure receiver 2 is therefore in communication with the pressure source 3.

In order to obtain the valve energization stage 1 shown in FIG. 3, the coil 5 is supplied with a partial current, causing the armature 13 to traverse only a small path. During this motion, the spreader spring 29 acts in the same direction as does the magnetic force, i.e., downwardly in the FIG. 3. This situation is represented in FIG. 5 showing the force of the spring 29 as curve 31. The right end of the curves corresponds to the first, upper position of the armature as seen in FIG. 3. In that first portion of the motion, the force of spring 29 is seen to be negative.

In the middle position of the armature, the force of spring 29 vanishes over a certain path, i.e., a force discontinuity 32 occurs which must be overcome by the armature in order to reach the fully energized, terminal position (bottom position in FIG. 4) when starting at the middle position. The presence of the force discontinuity 32 guarantees the stability of the middle position.

If the valve assembly 1 is to switch over completely to the second terminal state, the supply current of the coil 5 is further increased and the armature 13 moves completely downwardly (FIG. 4). At this point, the spring 14 is greatly compressed and the spring 29 has also been compressed again but, in this case, it opposes the magnetic force, as does the main spring 14. In this position, the carrier 15 holding the closure member 27 is held back by the end disc 18 and the closure member 27 can no longer obturate its seat 12. The outlet valve 12/27 is therefore relatively wide open and the pressure medium can flow from the pressure receiver 2 to the relief location 4. The spacer ring 16 (FIG. 1) prevents the armature 13 from traversing the last part of its stroke where the magnetic forces are high and are increasing steeply. Hence, only a relatively flat region of the characteristic force lines of the magnet is available for the actuation of the armature 13.

The diagram of FIG. 5 shows a force curve 30 for the main spring 14 which is seen to rise uniformly when going from right to left, corresponding to three positions of the armature which are separated in FIG. 5 by vertical lines (the middle double lines define the middle position of the armature). Curve 31 depicts the force of the spreader spring 29 and shows the force discontinuity 32. The curve 33 indicates the force of the spring 37 which is seen to be effective only from the middle position of the armature up to the fully energized terminal position.

Figure 6:
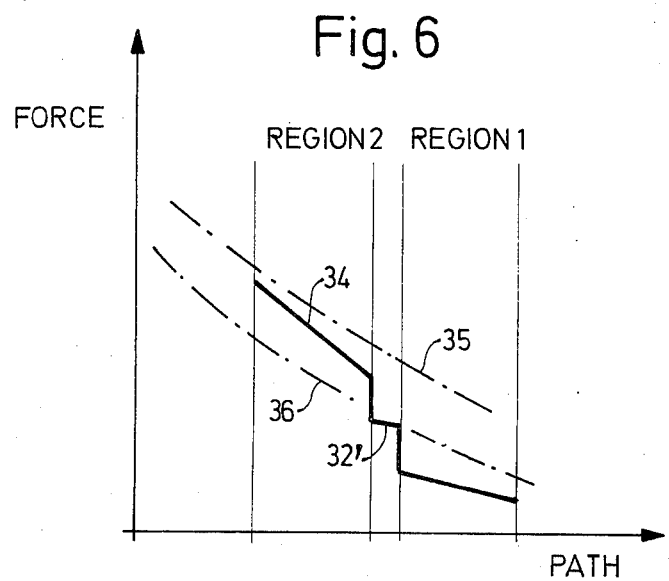
FIG. 6 is a diagram of the total spring force.

FIG. 6 is a diagram of the total spring force (curve 34) resulting from the summation of the curves 30, 31 and 33. As expected, this summation curve 34 has a discontinuity 32' which is due to spring 29. In addition, the figure shows the two magnetic forces, represented as curves 35 and 36; curve 36 shows the magnetic force in the partial energization stage 1 (FIG. 3) and curve 35 corresponds to the full energization stage 2 (FIG. 4).

It may be seen that the magnetic force of the second energization stage (FIG. 4) is greater in both domains of the motion than is the combined force of the springs. When the magnetization is at one half of full value, the magnetic force curve lies above the spring force in the first motional domain and lies below it in the second motional domain. This condition advantageously makes the function of the valve assembly 1 completely reliable. It is important that the characteristic force lines of the magnet be as flat as possible and this condition is met by the described disposition of the shoulder 15 and the extending collar 13' on the armature 13 and by the interposition of the spacer ring 16 in the recess of the element 9, as shown, which prevents the armature from traversing the final 0–0.3 mm of its stroke.

As seen in FIG. 6, in the flat region, the perpendicular distance between the magnetic force curves is relatively large with only relatively small dependence on the stroke. This condition facilitates adapting the spring characteristic to the magnetic force characteristics.

What is claimed is:

1. In an electromagnetic three-way valve including a cylindrical tube portion, a magnetic coil surrounding said tube portion; a first end member located in one end of said cylindrical tube portion and carrying a first valve seat; a second counter end member, located in a second end of said cylindrical tube portion and carrying a second valve seat; an armature, capable of moving axially of said cylindrical tube portion; two axially opposite valve closure members, mounted on holders guided loosely within an axial void in said armature and spread apart axially by a spreader spring; and a main spring, urging said armature to move toward said first end member, further characterized by said armature including an annular collar extension and said second counter end member including a complementally formed recess portion arranged to support a spacer ring and receive said annular collar extension during axial movement of said armature.

* * * * *